United States Patent
Lim et al.

(10) Patent No.: US 10,702,859 B2
(45) Date of Patent: Jul. 7, 2020

(54) METHOD FOR PREPARING LIGAND FOR POLYKETONE POLYMERIZATION CATALYST

(71) Applicant: ST PHARM CO., LTD., Gyeonggi-do (KR)

(72) Inventors: Geun Jho Lim, Seoul (KR); Sun Ki Chang, Gyeonggi-do (KR); Hyun Woo Baek, Gyeonggi-do (KR); Jun Hyun Oh, Gyeonggi-do (KR); Yeong Hun Kim, Gyeonggi-do (KR)

(73) Assignee: ST PHARM CO., LTD. (KR)

( * ) Notice: Subject to any disclaimer, the term of this patent is extended or adjusted under 35 U.S.C. 154(b) by 257 days.

(21) Appl. No.: 15/781,334

(22) PCT Filed: Nov. 11, 2016

(86) PCT No.: PCT/KR2016/013004
§ 371 (c)(1),
(2) Date: Jun. 4, 2018

(87) PCT Pub. No.: WO2017/099372
PCT Pub. Date: Jun. 15, 2017

(65) Prior Publication Data
US 2018/0361369 A1 Dec. 20, 2018

(30) Foreign Application Priority Data
Nov. 11, 2016 (KR) .................. 10-2015-0173044

(51) Int. Cl.
*C07F 9/655* (2006.01)
*B01J 31/02* (2006.01)
*C07F 9/50* (2006.01)
*C08L 61/34* (2006.01)

(52) U.S. Cl.
CPC ........... *B01J 31/0267* (2013.01); *B01J 31/02* (2013.01); *C07F 9/5027* (2013.01); *C07F 9/5072* (2013.01); *C07F 9/6552* (2013.01); *B01J 2231/14* (2013.01); *C08L 61/34* (2013.01)

(58) Field of Classification Search
None
See application file for complete search history.

(56) References Cited

FOREIGN PATENT DOCUMENTS

| KR | 101545286 B1 | 8/2015 |
| KR | 1020150122305 A | 11/2015 |
| WO | 20150009061 A1 | 1/2015 |

OTHER PUBLICATIONS

Japanese Office Action for Application No. 2018-524278, Reported dated Apr. 19, 2019.
Claudio Bianchini et al., "Copolymerization of Carbon Monoxide with Ethene Catalyzed by Palladium(II) complexes of 1.3 Bis(diphenylphosphino) propane Ligands Bearing Different Substituents on the Carbon Backbone", Macromolecules, 1999, vol. 32, No. 13, pp. 4183-4193.
Qingchen Dong, Y. et al., "Dual Coordination Modes of Ethylene-Linked NP2 Ligands in Cobalt (II) and Nickel (II) Iodides", Inorganic Chemistry, 2001, vol. 50, No. 20, pp. 10213-10224. See abstract.
International Search report for corresponding International Application No. PCT/KR2016/013004 filed on Nov. 11, 2016; Report dated Feb. 15, 2017.
Ashby, E. C. et al., "Investigation of the purity of alkali metal diphenylphosphides and their reactions with organic halides. Evidence for single electron transfer", The Journal of Organic Chemistry, 1993, vol. 58, No. 21, pp. 5832-5837. See p. 5833, left column; and Eq. 5.
Hamashima, Y. et al., "Highly enantioselective cyanosilylation of aldehydes catalyzed by a Lewis acid-Lewis base bifunctional catalyst", Tetrahedron, 2001, vol. 57, No. 5, pp. 805-814. See abstract.

*Primary Examiner* — Yun Qian
(74) *Attorney, Agent, or Firm* — Miller, Matthias & Hull LLP

(57) ABSTRACT

The present disclosure provides a method for preparing ((2,2-dimethyl-1,3-dioxane-5,5-diyl)bis(methylene))bis(bis(2-methoxyphenyl)phosphine), a ligand for a polyketone polymerization catalyst, under mild conditions with high purity and high yield. Therefore, the preparation method of the present disclosure can be easily applied to mass production.

8 Claims, No Drawings

METHOD FOR PREPARING LIGAND FOR POLYKETONE POLYMERIZATION CATALYST

CROSS-REFERENCE TO RELATED APPLICATIONS

This patent application is a 35 U.S.C. § 371 U.S. national stage filing of International Application No. PCT/KR2016/013004, filed in the Korean Receiving Office on Nov. 11, 2016, and claims priority to, and the benefit of, Korean Patent Application No. 10-2015-0173044, filed Dec. 7, 2015, the disclosures of which are hereby incorporated by reference in their entireties.

TECHNICAL FIELD

The present disclosure relates to a preparation method that allows for commercial mass production of a bisphosphine ligand for a polyketone polymerization catalyst as a safer way.

BACKGROUND ART

Polyketone in which a repeating unit derived from carbon monoxide and a repeating unit derived from an ethylenically unsaturated compound are substantially alternately connected with each other has excellent mechanical and thermal properties and high abrasion resistance, chemical resistance, and gas barrier properties and thus is useful in a variety of applications. The high molecular weight polyketone of the perfectly alternating copolymer has higher mechanical and thermal properties as well as high economic feasibility and thus is believed to be useful particularly as an engineering plastic material. For example, it is useful as vehicle parts such as gears due to its high abrasion resistance, useful as lining materials for chemical transferring pipes due to its high chemical resistance, and useful as lightweight gasoline tanks due to its high gas barrier properties. Moreover, the use of ultra-high molecular weight polyketone having an intrinsic viscosity of 2 or more for preparing fibers achieves a high stretch ratio, and the resulting fibers aligned in the stretching direction have high strength and high elasticity. Therefore, it is suitable materials for use as reinforcing materials for belts, rubber hoses, etc., tire cords, concrete reinforcing materials, building materials, and industrial materials.

A polymerization catalyst used for the preparation of polyketone is typically composed of the system of Pd (II)/bidentate phosphine ligand/acid. For example, a palladium acetate/1,3-bis[di(2-methoxyphenyl)phosphino]propane/trifluoroacetic acid(Pd(OAc)$_2$-BDOMPP-TFA) system was developed and commercialized by Shell Company in 1999. The ligand used in the system, BDOMPP, has the following structure:

1,3-bis[di(2-methoxyphenyl)phosphino]propane (BDOMPP)

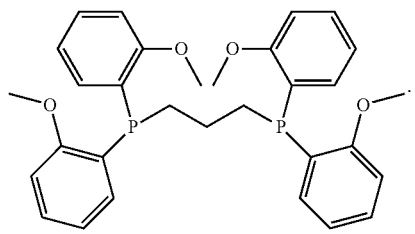

Since then, the development of high activity polymerization catalysts has continued steadily for more effective preparation of polyketone and specifically based on the modification of a bisphosphine ligand among three components of the polymerization catalyst.

Typically, 2,2-dimethoxy-1,3-bis[di(2-methoxyphenyl)phosphino]propane, 3,3-bis[bis-(2-methoxyphenyl)phosphanylmethyl]-1,5-dioxa-spiro[5,5]undecane, etc. have been known as ligands that surpass the activity of BDOMPP.

2,2-dimethoxy-1,3-bis[di(2-methoxyphenyl)phosphino]propane

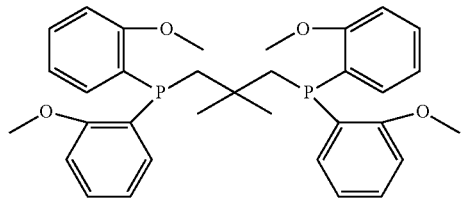

3,3-bis[bis-(2-methoxyphenyl)phosphanylmethyl]-1,5-dioxa-spiro[5,5]undecane

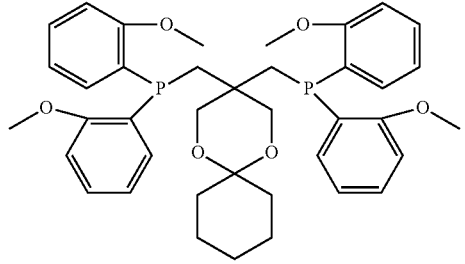

These ligands averagely have polymerization activity more than two times than the BDOMPP system, but the commercial synthesis is not easy to achieve and requires high costs.

In particular, the synthesis method disclosed in International Patent Publication No.: WO 2001/002463 relating to 3,3-bis[bis-(2-methoxyphenyl)phosphanylmethyl]-1,5-dioxa-spiro[5,5]undecane with high activity is a dangerous reaction that can be carried out only in a Lab scale with the use of lithium and is not suitable for commercial mass production.

Therefore, the development of novel polyketone polymerization catalysts and synthesis processes that shows high polymerization activity and is possible to economical and commercial mass production has been required. ((2,2-dimethyl-1,3-dioxane-5,5-diyl)bis(methylene))bis(bis(2-methoxyphenyl)phosphine) represented by the following Formula 1 has been developed (International Patent Publication No.: WO 2015/009061):

[Formula 1]

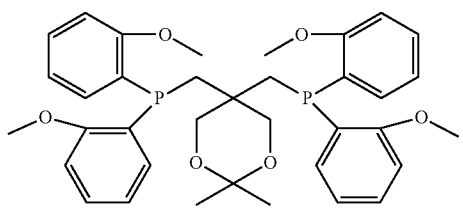

This novel ligand exhibits the same activity as 3,3-bis[bis-(2-methoxyphenyl)phosphanylmethyl]-1,5-dioxa-spiro[5,5]undecane, which has been known to exhibit the highest activity, has a simpler structure and a lower molecular weight, which reduces the manufacturing costs, and is more advantageous for industrialization.

However, the synthesis method disclosed in International Patent Publication No.: WO 2015/009061 uses sodium hydride as a base that has the risk of explosion, and the yield of the final product is very low, and thus it is not suitable for mass production.

DISCLOSURE

Technical Problem

Therefore, an object of the present disclosure is to provide a method for preparing a ligand for a polyketone polymerization catalyst in a stable manner with high yield even in an industrial scale.

Technical Solution

The present disclosure provides a method for preparing a ligand compound represented by the following Formula 1:

[Formula 1]

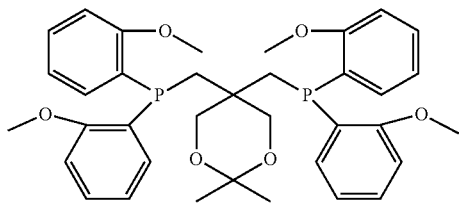

The preparation method of the present disclosure comprises a step (S1) of reacting a compound represented by the following Formula 2 with a compound represented by the following Formula 3 in the presence of a base that is sodium tert-butoxide or potassium tert-butoxide:

[Formula 2]

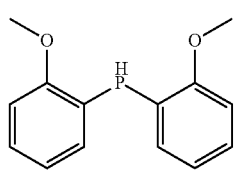

[Formula 3]

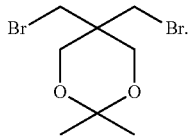

Moreover, the method of the present disclosure may further comprise a step (S2) of recrystallizing the compound of Formula 1 obtained in the above step (S1).

Step (S1): Alkyl Substitution Reaction

In the step (S1), the reaction may be carried out in the presence of an inorganic base, particularly, sodium tert-butoxide or potassium tert-butoxide. Preferably, Sodium tert-butoxide may be used. With the use of the base in the reaction, it is possible to prepare the compound of Formula 1 with a higher yield than the conventional synthesis methods. Moreover, the preparation method of the present disclosure does not use sodium hydride (NaH) that has the risk of explosion and fire during the process, which does not require a quenching process, and the reaction can be carried out stably under mild conditions.

In the step (S1), the reaction may be carried out in the presence of an organic solvent that is typically used in the alkyl substitution reaction. Preferably, dimethylsulphoxide (DMSO), dimethylformamide (DMF) or dimethylformacetamide (DMAc) may be used, but not limited thereto.

The reaction in the step (S1) may be carried out at room temperature, specifically 20° C. to 30° C., preferably 20° C. to 23° C., but not limited thereto.

According to a preferred embodiment of the present disclosure, the step (S1) may further comprise a recrystallization step. A solvent used in the recrystallization step may preferably be methanol.

In the step (S1), the compound of Formula 1 can be obtained with a high purity of 90% or higher, preferably 95% or higher, more preferably 98% or higher. Moreover, the compound of Formula 1 can be obtained with a high yield of 65% or higher.

Step (S2): Recrystallization for Improvement of Bulk Density

The step (S2) is carried out to recrystallize crystals of the compound of Formula 1 obtained in the step (S1) to meet the bulk density of the ligand required for an automated production facility in an industrial scale for polyketone polymerization.

A recrystallization solvent used in the step (S2) may be selected from the group consisting of methylene chloride, methanol, water, acetone, and mixtures thereof. Preferably, the mixed solvent of methylene chloride and methanol may be used. The volume ration of methylene chloride to methanol may be 1:3 to 1:20, preferably 1:3 to 1:10, more preferably 1:4 to 1:6, but not limited thereto.

The recrystallization in the step (S2) may be carried out at a temperature of 0° C. to 20° C., preferably 0° C. to 10° C., more preferably 0° C. to 5° C., but not limited thereto.

In the step (S2), the compound of Formula 1 can be obtained with a bulk density of 0.40 g/ml or higher.

Advantageous Effects

The present disclosure can prepare ((2,2-dimethyl-1,3-dioxane-5,5-diyl)bis(methylene))bis(bis(2-methoxyphenyl)phosphine), a ligand for a polyketone polymerization catalyst, with high purity and high yield under mild conditions without the risk of explosion. Therefore, the preparation method of the present disclosure can be easily applied to mass production.

MODE FOR INVENTION

Hereinafter, preferred examples will be described for a better understanding of the present disclosure. However, the following examples are provided for illustrative purpose only and are not intended to limit the scope of the present disclosure.

Moreover, unless otherwise stated, the reagents and solvents mentioned below were purchased from Sigma-Aldrich Korea, and $^{31}P$ and $^1H$ NMR were recorded on an Oxford NMR 300 MHz spectrometer (Varian Mercury Instrument).

PREPARATION EXAMPLES: PREPARATION OF REACTANTS FOR ALKYLATION REACTION

Preparation Example 1: Preparation of bis(2-methoxyphenyl)phosphine (Formula 2)

Bis(2-methoxyphenyl)phosphine oxide (1 kg, 3.78 mol) synthesized by Grignard reaction of phosphorus trichloride and 2-bromoanisole was dissolved in 25 L of acetonitrile, and then triethylamine (1.2 kg, 11.35 mol) was added thereto at an internal temperature of 20° C. to 25° C. Then, trichlorosilane (1.5 kg, 11.35 mol) was added thereto while maintaining the internal temperature below 45° C. The resulting mixture was stirred at an internal temperature of 65° C. to 70° C. for 2 hours and then cooled. After the completion of cooling, the reaction was terminated with 25% sodium hydroxide, followed by phase separation. The organic phase was dried over anhydrous sodium sulfate and then concentrated. The concentrated residue was recrystallized with anhydrous ethanol to yield the target compound (0.82 kg, 88.0%).

$^1H$ NMR (CDCl$_3$): 7.20-7.40 (m, 4H), 6.60-6.80 (m, 4H), 5.56 (s, 0.5H), 4.80 (s, 0.5H), 3.79 (s, 6H)

$^{31}P$ NMR(CDCl$_3$): −70

Preparation Example 2: Preparation of 5,5-bis(bromomethyl)-2,2-dimethyl-1,3-dioxane (Formula 3)

2,2-(bromomethyl)propane-1,3-diol (1 kg, 3.8 mol) was dissolved in 4 L of methylene chloride under a nitrogen atmosphere. 2,2-dimethoxypropane (596 g, 5.7 mol) was added thereto and cooled to an internal temperature of 0° C. to 5° C. Concentrated sulfuric acid (7 g, 18.8 mmol) was added thereto while maintaining the internal temperature and then stirred for 5 hours at an internal temperature of 0° C. to 5° C. The resulting mixture was washed with an aqueous solution of sodium hydrogen carbonate twice and then with water. Then, the resulting mixture was dried over anhydrous sodium sulfate, and then the solvent was concentrated under reduced pressure to yield the target compound (1.11 kg, 96.4%).

$^1H$ NMR (CDCl$_3$): 3.79 (s, 4H), 3.57 (s, 4H), 1.41 (s, 6H)

Comparative Example: Preparation of ((2,2-dimethyl-1,3-dioxane-5,5-diyl)bis(methylene))bis(bis(2-methoxyphenyl)phosphine) according to the preparation method of WO 2015/009061

Bis(2-methoxyphenyl)phosphine (1 kg, 4.06 mol) prepared in Preparation Example 1 and dimethylsulfoxide (11 kg) were placed in a reaction vessel under a nitrogen atmosphere, sodium hydride (60%) (0.33 kg, 8.12 mol) was added thereto at room temperature, and the resulting mixture was stirred for 1 hour.

A mixed solution of 5,5-bis(bromomethyl)-2,2-dimethyl-1,3-dioxane (736 g, 2.84 mol) prepared in Preparation Example 2 and dimethylsulfoxide (5.5 kg) was slowly added thereto and stirred for 2 to 4 hours.

After the completion of the reaction, 2 L of methanol was slowly added to terminate the reaction, and then 10 L of toluene and 10 L of water were added, followed by phase separation. The organic phase was washed with water twice and then dried over anhydrous sodium sulfate, followed by concentration.

The residue was recrystallized with methanol to yield ((2,2-dimethyl-1,3-dioxane-5,5-diyl)bis(methylene))bis(bis(2-methoxyphenyl)phosphine) (0.42 kg, 32.9%, 98.0% or higher ($^{31}P$-NMR purity)).

$^1H$ NMR (CDCl$_3$): 7.26-7.16 (m, 8H), 6.87-6.75 (m, 8H), 3.92 (s, 4H), 3.70 (s, 12H), 2.51 (d, 4H), 1.44 (s, 6H)

$^{31}P$ NMR(CDCl$_3$): −46.04

Examples: Preparation of ((2,2-dimethyl-1,3-dioxane-5,5-diyl)bis(methylene))bis(bis(2-methoxyphenyl)phosphine) According to the Preparation Method of the Present Disclosure Example 1: Alkylation Reaction Using Sodium Tert-Butoxide Bis(2-methoxyphenyl)phosphine (1 kg, 4.06 mol) prepared in Preparation Example 1 and dimethylsulfoxide (11 kg) were placed in a reaction vessel under a nitrogen atmosphere, sodium tert-butoxide (0.47 kg, 4.87 mol) was added thereto at room temperature, and the resulting mixture was stirred for 1 hour.

A mixed solution of 5,5-bis(bromomethyl)-2,2-dimethyl-1,3-dioxane (736 g, 2.84 mol) prepared in Preparation Example 2 and dimethylsulfoxide (5.5 kg) was slowly added thereto and stirred for 2 to 4 hours.

After the completion of the reaction, 10 L of toluene and 10 L of water were added, followed by phase separation. The organic phase was washed with water twice and then dried over anhydrous sodium sulfate, followed by concentration.

The residue was recrystallized with methanol to yield ((2,2-dimethyl-1,3-dioxane-5,5-diyl)bis(methylene))bis(bis(2-methoxyphenyl)phosphine) (1.08 kg, 84.0%, 98.0% or higher ($^{31}P$-NMR purity)).

$^1H$ NMR (CDCl$_3$) and $^{31}P$ NMR(CDCl$_3$): the same as the Comparative Example.

Example 2: Alkylation Reaction Using Potassium Tert-Butoxide

Bis(2-methoxyphenyl)phosphine (1 kg, 4.06 mol) prepared in Preparation Example 1 and dimethylsulfoxide (11 kg) were placed in a reaction vessel under a nitrogen atmosphere, potassium tert-butoxide (0.55 kg, 4.87 mol) was added thereto at room temperature, and the resulting mixture was stirred for 1 hour.

A mixed solution of 5,5-bis(bromomethyl)-2,2-dimethyl-1,3-dioxane (736 g, 2.84 mol) prepared in Preparation Example 2 and dimethylsulfoxide (5.5 kg) was slowly added thereto and stirred for 2 to 4 hours.

After the completion of the reaction, 10 L of toluene and 10 L of water were added, followed by phase separation. The organic phase was washed with water twice and then dried over anhydrous sodium sulfate, followed by concentration.

The residue was recrystallized with methanol to yield ((2,2-dimethyl-1,3-dioxane-5,5-diyl)bis(methylene))bis(bis (2-methoxyphenyl)phosphine) {0.89 kg, 69.5%, 98.0% or higher ($^{31}$P NMR purity)}.

$^1$H NMR (CDCl$_3$) and $^{31}$P NMR(CDCl$_3$): the same as the Comparative Example.

Example 3: Recrystallization for Improvement of Bulk Density 1 kg of ((2,2-dimethyl-1,3-dioxane-5,5-diyl)bis(methylene))bis(bis(2-methoxyphenyl)phosphine) crystals prepared in Example 1 were completely dissolved in 1.5 L of methylene chloride, and then 7 L of methanol was added thereto while maintaining an internal temperature of 0° C. to 5° C. The resulting mixture was stirred for 1 hour while maintaining the internal temperature of 0° C. to 5° C. and filtered to yield ((2,2-dimethyl-1,3-dioxane-5,5-diyl)bis(methylene))bis(bis(2-methoxyphenyl)phosphine) with a bulk density of 0.40 g/ml or higher (0.9 kg, 90.0%, 0.55 g/ml).

The invention claimed is:

1. A method for preparing a compound represented by the following Formula 1, comprising a step (S1) of reacting a compound represented by the following Formula 2 with a compound represented by the following Formula 3 in the presence of a base which is sodium tert-butoxide or potassium tert-butoxide:

[Formula 1]
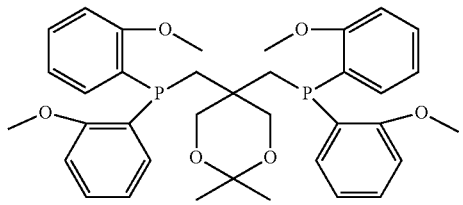

[Formula 2]
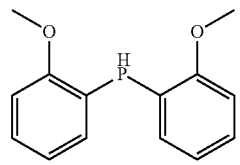

[Formula 3]
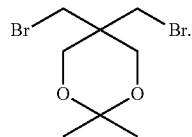

2. The method of claim 1, wherein the base is sodium tert-butoxide.

3. The method of claim 1, further comprising a step (S2) of recrystallizing the compound of Formula 1 obtained in the above step (S1) using a crystallization solvent.

4. The method of claim 3, wherein the recrystallization solvent is selected from the group consisting of methylene chloride, methanol, water, acetone, and mixtures thereof.

5. The method of claim 4, wherein the recrystallization solvent is a mixed solvent of methylene chloride and methanol.

6. The method of claim 5, wherein the volume ration of methylene chloride to methanol is 1:3 to 1:20.

7. The method of claim 3, wherein the recrystallization step is carried out at a temperature of 0° C. to 10° C.

8. The method of claim 3, wherein the bulk density of the compound of Formula 1 is 0.40 g/ml or higher.

* * * * *

UNITED STATES PATENT AND TRADEMARK OFFICE
CERTIFICATE OF CORRECTION

PATENT NO. : 10,702,859 B2
APPLICATION NO. : 15/781334
DATED : July 7, 2020
INVENTOR(S) : Geun Jho Lim et al.

Page 1 of 1

It is certified that error appears in the above-identified patent and that said Letters Patent is hereby corrected as shown below:

On the Title Page

Item [30], should read:
--Foreign Application Priority Data: December 7, 2015 KR 10-2015-0173044--

Signed and Sealed this
Twenty-second Day of September, 2020

Andrei Iancu
*Director of the United States Patent and Trademark Office*